Feb. 9, 1932.    P. M. STIVENDER    1,844,720
ELECTRICAL CONTROL SYSTEM
Filed Nov. 22, 1929
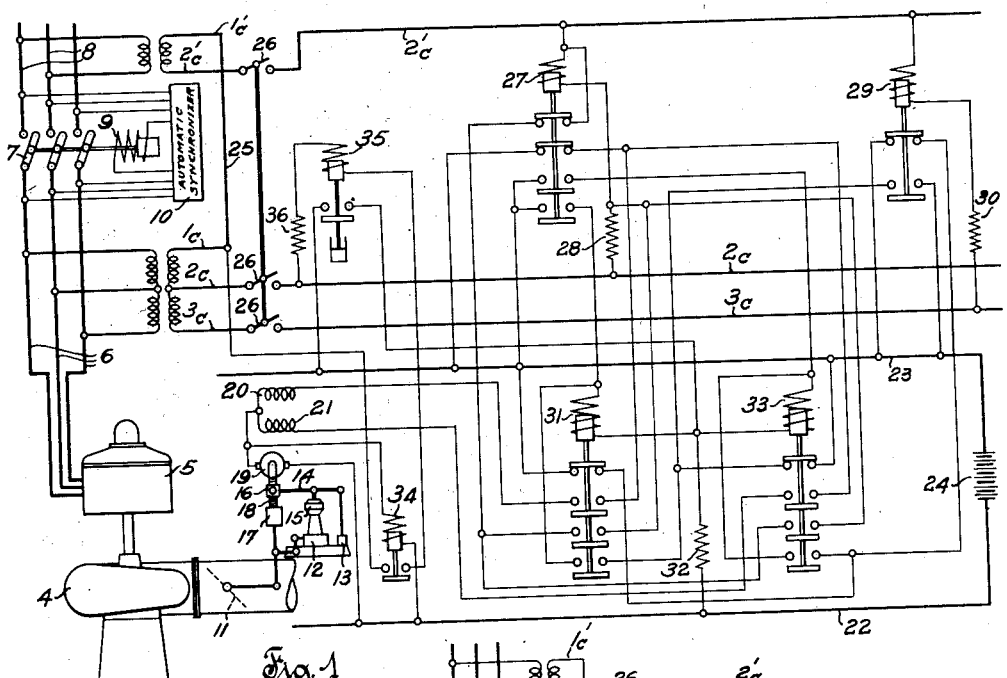
Fig. 1
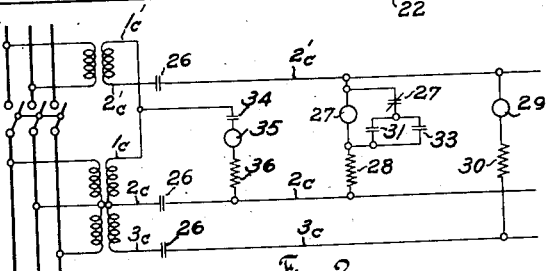
Fig. 2
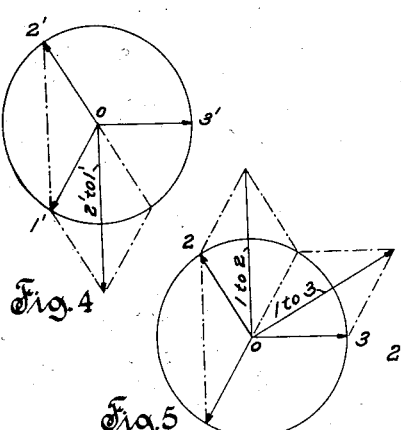
Fig. 4
Fig. 5
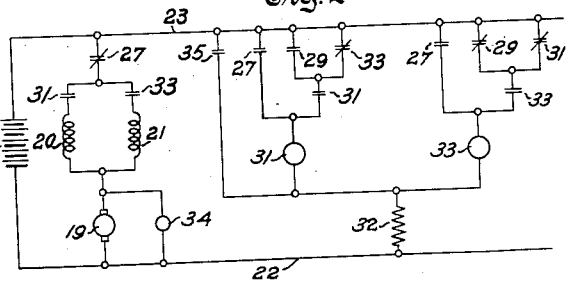
Fig. 3
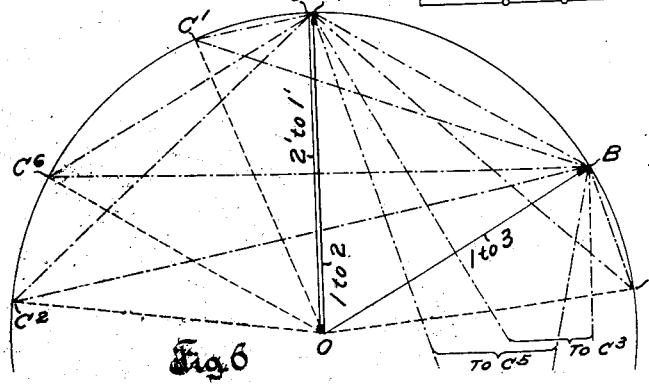
Fig. 6
Inventor
P. M. Stivender
by
Attorney Patented Feb. 9, 1932

1,844,720

UNITED STATES PATENT OFFICE

PAUL M. STIVENDER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE

ELECTRICAL CONTROL SYSTEM

Application filed November 22, 1929. Serial No. 409,072.

This invention relates to electrical control systems, and more particularly to systems which respond to or control the relative frequencies of sources of alternating current. For the sake of brevity the words "alternating current" will be hereinafter abbreviated to a-c.

One of the objects of the invention is the provision of means responding to the relative frequencies of two a-c. sources, and more particularly the production of predetermined effects in response to effective operation of said means. A more specific object is the provision of means whereby the frequencies of the two sources are brought to the same value in response to said means.

A further object is the provision of means responding to the relative frequencies of two a-c. sources which comprises relays as its essential elements. A more specific object is the provision of means whereby the relays are caused to be effectively operated in different predetermined orders depending upon the relative frequencies of the two sources. Other objects will appear hereinafter as the description of the invention proceeds.

The novel features of the invention will appear from this specification and the accompanying drawings forming a part thereof and showing one embodiment of the invention, and all these novel features are intended to be pointed out in the claims.

In the drawings:

Fig. 1 is a diagrammatic view of one embodiment of the invention as it may be applied in the control of a polyphase generator.

Figs. 2 and 3 are across-the-line diagrams of the same circuits as illustrated in Fig. 1.

Figs. 4 and 5 are vector diagrams illustrating electromotive forces which are applied to certain parts of the system and Fig. 6 is a diagram illustrating various vector polygons resulting from a combination of certain vectors in Figs. 4 and 5.

Referring to Fig. 1 of the drawings there is here shown a prime mover 4, indicated as a hydraulic turbine. It is to be understood however that the invention is not limited in its application to any particular form of prime mover. The turbine 4 drives a generator 5 supplying the three phase conductors 6 which may be connected by means of a switch 7 to a three phase line 8. The switch 7 is here shown as provided with an operating coil 9 which may be energized by means of any suitable form of automatic synchronizer. Inasmuch as the synchronizer forms no part of the present invention it has merely been indicated in the drawings by reference number 10.

The turbine 4 is shown as controlled by means of a gate 11 in the conduit supplying operating fluid thereto. It is of course to be understood that any of the usual means for controlling the supply of operating fluid to a prime mover may be employed. The gate 11 may be operated by means of a servo-motor 12 which is indicated as controlled by a regulating valve 13. The regulating valve 13 is here shown as controlled in the usual manner by means of a floating lever to the floating pivot of which is connected a centrifugal speed responsive device contained in the casing 15. The other end of the floating lever 14 is pivotally connected to a nut 16 which is in operative relation to a screw 18. The lower end of the screw 18 is suitably connected to the usual dash pot or compensating device 17 the other element of which is operated in unison with the motion of the gate 11. These parts have been shown in diagrammatic form as they are well known in the art and their specific embodiment forms no part of the invention. The screw 18 may be rotated by means of a motor 19 here shown as of the direct current split field type, the field windings being indicated as 20 and 21. One terminal of the armature of motor 19 is connected to a bus 22 the other terminal being connected to a common terminal for the field windings 20 and 21. The other terminals of the field windings are connectible to another bus 23, so that if field winding 20 is connected to bus 23 the motor 19 will rotate in one direction whereas if field winding 21 is connected to bus 23 it will rotate in the other direction. The buses 22, 23 are fed from any suitable source here indicated as a battery 24.

Connected across two of the phase conductors of the polyphase line 8 is a transformer the terminals of the secondary of which are connected to conductors $1'_c$ and $2'_c$. To the corresponding phase conductors of the generator 5 which are connectible to the same conductors to which the beforementioned transformer is connected, is connected a transformer the secondary terminals of which are connected to conductors $1_c$ and $2_c$. Another pair of the phase conductors leading from the generator has connected thereto a transformer the secondary terminals of which are connected to the conductor $2_c$ and a conductor $3_c$. The conductor $1'_c$ is connected by means of a conductor 25 to the conductor $1_c$. The conductors $2'_c$, $2_c$ and $3_c$ are extended to control relays as will appear hereinafter, and these conductors may be controlled by a switch 26 in any suitable fashion.

A relay 27 has one terminal connected to conductor $2'_c$ and the other connected, through a resistance 28, to conductor $2_c$. A relay 29 has one terminal connected to conductor $2'_c$ and the other, through a resistance 30, to the conductor $3_c$. A pair of auxiliary relays 31, 33 is connectible across the buses 22, 23, through a resistance 32, as will more fully appear. Another auxiliary relay 34 is connected across the armature terminals of the motor 19, and this relay has a contact which controls an adjustable time-limit relay 35 which is here shown as fed from conductors $1_c$ and $2_c$. The relay 35 has a contact in a circuit adapted to shunt the operating coils of relays 31 and 33.

Referring again to relay 27, this is here shown as provided with four contacts two of which are front and two of which are back contacts. By front contacts is meant contacts which are adapted to close a circuit when the relay is energized and by back contacts is meant contacts which are adapted to open a circuit when the relay is energized. In the across-the-line diagrams of Figs. 2 and 3, front contacts are indicated by a pair of parallel lines and back contacts by a pair of parallel lines crossed by a diagonal line. The relay coils are indicated by circles. The coil and contacts of a given relay bear the same reference numeral. The two front contacts of relay 27 are adapted to close the circuits of relays 31 and 33 respectively. One of the back contacts is adapted to complete a circuit through the armature of motor 19 and either of the field windings 20 or 21 depending upon which of relays 31 and 33 is energized. The other back contact is adapted to close a lockout circuit in shunt in relay 27 depending upon which of relays 31 or 33 is energized.

Relay 29 has one front contact and one back contact. The front contact is in a circuit in shunt with that front contact of relay 27 which controls relay 31, and the back contact is in a circuit in shunt with that front contact of relay 27 which controls relay 33.

Relay 31 is here shown as having three front and one back contacts. One of the front contacts controls the circuit through the field winding 20; another controls two possible circuits in shunt with that front contact of relay 27 which controls relay 31; and another is in one of the above mentioned lockout circuits for relay 27. The back contact is in a circuit in shunt with that front contact of relay 27 which controls relay 33.

Relay 33 is here shown as having three front and one back contacts. One of the front contacts controls the circuit through field winding 21; another controls two possible circuits in shunt with that front contact of relay 27 which controls relay 33; and another is in one of the above mentioned lockout circuits for relay 27. The back contact is in a circuit in shunt with that front contact of relay 27 which controls relay 31.

In order to determine the electromotive forces (hereinafter abbreviated to "emfs.") applied to relays 27 and 29 respectively under various conditions, the vector components of these emfs. will be considered first. Referring now to Fig. 4, the vectors 0—2' and 0—1' indicate the electromotive forces between a neutral point 0 and the conductors 2' and 1' respectively. The phase-to-phase emf. is then that indicated by the vector marked with the legend 2' to 1'. Referring now to Fig. 5 and assuming that the polyphase emfs. of the generator and line are in phase, the vectors 0—1, 0—2, and 0—3 correspond to the emfs. between a neutral point 0 and the conductors $1_c$, $2_c$, and $3_c$ respectively. Since the circuit for relay 27 for example is as here shown from $2'_c$ to $1'_c$ to $1_c$ to $2_c$, the emf. across $1_c$ and $2_c$ is laid off in the reverse direction in the diagram in Fig. 5 and bears the legend, 1 to 2. The emf. across the conductors $1_c$ and $3_c$ is laid off as the vector bearing legend, 1 to 3, in Fig. 5. In order to determine the emfs. across the relays 27 and 29 the vectors obtained as hereinbefore stated have been laid off in a diagram of vector polygons in Fig. 6.

For the sake of convenience in forming the vector polygons the head of the arrow CO, representing the vector 2' to 1', is at the point 0 in Fig. 6, for various positions of that vector, while the tail of the arrow OA, representing the vector 1 to 2 is at the point 0. It may be noted that, for the sake of clearness, the vectors CO and OA are shown as side-by-side though they are actually superimposed when, as assumed, the generator and line are in phase.

It will be apparent from what has been previously stated that the emf. across relay 27 is represented by the distance between the points C and A which, when the line and generator are in phase, is equal to zero. Moreover since the circuit for relay 29 is from $2'_c$ to $1'_c$ to $1_c$ to $3_c$, the emf. across this relay is represented by the vector CB. Let it be assumed that this vector represents a potential difference of 100 volts and that the resistance 30 is so adjusted that for 100 volts across the conductors $2'_c$ and $3_c$, the relay 29 will not be effectively energized. Let it further be assumed that in case the emf. across these conductors rises to 130 volts that said relay will be effectively energized. The relay 27 may be adjusted in like manner by resistance 28 so that it will be deenergized at 100 volts across conductors $2'_c$ and $2_c$ and will be energized at 130 volts across these conductors. These voltages are given merely by way of example and it will be apparent that other values may be utilized.

In case the line and generator frequencies are not equal the vectors 1', 2', 3' and 1, 2, 3 will rotate at different speeds. In order to consider the effect of the relative rotation as between these vectors we may consider the vectors 1, 2, 3 as stationary and the vectors 1', 2', 3' as revolving with respect thereto. In connection with Fig. 6 this will mean that we will consider the vectors OA and OB as stationary and the vector CO as revolving about the point 0 in either one direction or the other depending upon whether the line frequency is above or below that of the generator.

If it be assumed that when the line frequency is below that of the generator, the vector CO rotates in a counter-clockwise direction, then when the outside end of said vector reaches the position C' the relay 29 will be effectively energized since the voltage across this relay is now represented by vector C'B, in the assumed instance, 130 volts. The relay 29 thereby closes its front contact and opens its back contact but no further effect is produced. When the vector CO reaches the position $C^2$ the emf. across relay 27 is represented by $C^2A$ which in the instance assumed is 130 volts and therefore relay 27 is effectively energized. It may be noted that the emf. across relay 29 is represented by vector $C^2B$ and therefore this relay remains energized. Energization of relay 27 causes energization of relays 31 and 33. However, since when relay 27 is energized the back contact controlling the motor 19 is open no effect on the motor circuit takes place due to the closure of relays 31 and 33. Further rotation of the vector CO brings it to the point $C^3$ (which point is also on the circle in Fig. 6 and is indicated by the vectors marked with the legend—To $C^3$—). The emf. across relay 27, represented by vector $C^3A$ is still sufficient to maintain this relay energized. However, the emf. $C^3B$ is 100 volts and consequently the relay 29 is deenergized. When the rotating vector reaches the point B the voltage across relay 27 is represented by AB and therefore relay 27 is also deenergized. The deenergization of relay 27 causes deenergization of relay 31 because at that time the front contact of relay 29 in the possible shunt circuit for the front contact of relay 27 controlling relay 31 is open. The same is true of the back contact of relay 33 which is in another possible shunt circuit to the said front contact of relay 27. The relay 33 however remains energized because at the time that relay 27 drops out the back contact of relay 29 which is in a possible shunt circuit for the front contact of relay 27 which controls the relay 33, is closed. The relay 33 being energized at the time first stated, and remaining energized, the front contact of this relay which is in a possible shunt circuit for relay 27 is also closed and the closure of the back contact of relay 27 in this shunt circuit, when relay 27 drops out, locks said relay out. The opening of relay 31 locks relay 33 in by closure of the back contact of relay 31.

The result of the above operations is that the circuit of motor 19 is completed through its armature, field winding 21, a front contact of relay 33, and a back contact of relay 27. The motor 19 now rotates in such direction as to move the nut 16 in the proper direction for adjusting the governor to lower the speed of the generator 5.

When emf. is applied to motor 19 the relay 34 is simultaneously energized and this relay in turn closes the circuit of the adjustable time limit relay 35. After a predetermined time the relay 35 short-circuits the operating coils of both relays 31 and 33. The opening of relay 33 deenergizes the motor circuit and consequently also the relay 34. The hereinbefore described cycle of operations is now ready to be repeated, and it will be repeated the oftener the greater the difference in frequency between the generator and the line. On the other hand if the difference is slight the cycle will be repeated at comparatively long intervals since the rotation of vector CO is then very slow.

Let it now be assumed that the frequency of the line is above that of the generator, in which case the vector CO will rotate in a direction opposite from that previously assumed, that is, in a clockwise direction. If we begin again with the emfs. of line and generator in phase, both relays 27 and 29 are deenergized. When the vector CO reaches the point $C^4$ the emf. $C^4A$ is sufficient to energize relay 27. Relays 31 and 33 are now both energized but since the back contact of relay 27 controlling the circuit of motor 19 is open there is no further effect. When the rotating vector reaches the point $C^5$ as indicated by the direction of the vectors bearing the legend —To $C^5$—, the emf. $C^5B$ is sufficient to energize relay 29, relay 27 being still energized. When the rotating vector reaches the point C⁶ the relay 29 is still energized since the emf. across it is represented by C⁶B, but relay 27 drops out since the emf. is 100 volts as represented by vector C⁶A. The dropping out of relay 27 at the time while relay 29 is energized results in relay 31 remaining energized because the front contact of relay 29 which is in a possible shunt circuit for that front contact of relay 27 which controls relay 31 is closed at that time as is also the front contact of relay 31 in the same shunt circuit. On the other hand, relay 33 is deenergized because at the said time the back contact of relay 29 in the possible shunt circuit for the front contact of relay 27 which controls relay 33 is open as is also the back contact of relay 31 in a similar possible shunt circuit. When relay 27 drops out it is locked out by a circuit in shunt with the relay passing through a back contact of that relay and a front contact of relay 33. Relay 31 is locked in when relay 33 drops out by reason of the closure of a back contact of relay 33.

The result of the foregoing operations is that the circuit of motor 19 is closed through its armature, field winding 20, a front contact of relay 31 and a back contact of relay 27. The motor 19 now runs in such direction that the frequency of generator 5 is caused to increase. In this case also energization of the motor causes relay 34 to start the time limit relay 35 which after a predetermined time short-circuits relays 31, 33. The resultant dropping out of relay 31 deenergizes the circuit of motor 19 and the parts are again in a position to repeat the cycle.

It will be evident that when there is a large difference in frequencies between the generator and line the speed and frequency of the generator will be changed rapidly to cause it to approach that of the line and as the difference in frequencies becomes less the rapidity of change in the frequency of the generator is also decreased, thereby rendering synchronization between the generator and line very easy.

When the generator has been brought to the same frequency as that of the line (whether it was at first higher or lower in frequency) the switch 7 may be closed when the generator and line are in phase and this may be accomplished in any suitable manner, if desired, by an automatic synchronizer 10 here indicated merely by an appropriate legend.

While the connections of the transformers for feeding relays 27 and 29 are preferred as shown, it will be apparent to those skilled in the art that the vector polygons as described in connection with Fig. 6 will apply equally well if the connections 1'c and 2'c are reversed, that is, the conductor 2'c leading to the upper (as viewed in Fig. 1) terminals of relays 27 and 29, becomes 1'c, and the conductor 25 is connected to terminal 2'c instead of 1'c. The only difference is that the condition represented by the vectors in full lines in Fig. 6 then represents the condition when the generator and line are 180 degrees out of phase. The principle of operation of the relays as hereinbefore described however remains unchanged as far as the control of the speed of the generator to bring the frequency to the same as that of the line is concerned.

It should be understood that it is not desired to limit the invention to the exact details of description shown and described for obvious modifications may occur to persons skilled in the art.

It is claimed and desired to secure by Letters Patent:

1. In combination, a pair of polyphase a-c. sources, a pair of relays, means for so connecting said relays to said sources that at the instant said sources are in phase neither of said relays is effectively energized, and when said sources fall out of phase in one direction one of said relays is effectively energized before the other and when said sources fall out of phase in the other direction the other of said relays is effectively energized before said first mentioned relay, and means controlled jointly by said relays for producing a predetermined effect.

2. In combination, a pair of polyphase sources, a relay, means for so connecting said relay to said sources that when they are in phase substantially no emf. is impressed on said relay, a second relay, means for so connecting said second relay that when said sources are in phase an emf. proportional to substantially the phase to phase emf. is impressed on said second relay, and means controlled jointly by said relays for producing a predetermined effect.

3. In combination, a pair of polyphase sources, a relay, means for so connecting said relay that when said sources are in phase no emf. is impressed on said relay and when they are 180 degrees out of phase an emf. proportional to substantially double the phase to phase voltage is impressed on said relay, a second relay, means for so connecting said second relay that when said sources are in phase, or 120 degrees out of phase in one direction, an emf. proportional to substantially the phase to phase emf. is impressed on said second relay, and when said sources are 120 degrees out of phase in the other direction an emf. proportional to substantially double the phase to phase voltage is impressed on said second relay, and means controlled jointly by said relays for producing a predetermined effect.

4. In combination, a polyphase a-c. line, a polyphase a-c. generator, a pair of relays, means for connecting said relays to said line and generator that at the instant said line and generator are in phase neither of said relays is effectively energized, and when said line and generator fall out of phase in one direction one of said relays is effectively energized before the other, and when said line and generator fall out of phase in the other direction the other of said relays is effectively energized before said first mentioned relay, and means controlled jointly by said relays for regulating the speed of said generator.

5. In combination, a polyphase a-c. line, a polyphase a-c. generator, a relay, means for so connecting said relay that when said generator and line are in phase substantially no emf. is impressed on said relay, a second relay, means for so connecting said second relay that when said line and generator are in phase an emf. proportional to substantially the phase-to-phase emf. is impressed on said second relay, and means controlled jointly by said relays for regulating the speed of said generator.

6. In combination, a polyphase a-c. line, a polyphase a-c. generator, a relay, means for so connecting said relay that when said generator and line are in phase no emf. is impressed on said relay and when they are 180 degrees out of phase an emf. proportional to substantially double the phase-to-phase voltage is impressed on said relay, a second relay, means for so connecting said second relay that when said line and generator are in phase, or 120 degrees out of phase in one direction, an emf. proportional to substantially the phase-to-phase emf. is impressed on said second relay, and when said line and generator are 120 degrees out of phase in the other direction an emf. proportional to substantially double the phase-to-phase voltage is impressed on said second relay, and means controlled jointly by said relays for regulating the speed of said generator.

7. In combination, a pair of polyphase a-c. sources, a transformer connected across a pair of phase conductors of one of said sources, a second transformer connected across a corresponding pair of phase conductors of the other of said sources, a relay, means for connecting the secondaries of said transformers in series with said relay, a third transformer connected to a different pair of phase conductors of said other of said sources, a second relay, means for connecting the secondaries of all of said transformers in series with said second relay, and means controlled jointly by said relays for producing a predetermined effect.

8. In combination, a polyphase a-c. line, a polyphase a-c. generator, a transformer connected across a pair of phase conductors of said line, a second transformer connected across a corresponding pair of phase conductors of said generator, a relay, means for connecting the secondaries of said transformers in series with said relay, a third transformer connected to a different pair of phase conductors of said generator, a second relay, means for connecting the secondaries of all of said transformers in series with said second relay, and means controlled jointly by said relays for regulating the speed of said generator.

9. In combination, a plurality of relays, means for energizing and deenergizing said relays in a predetermined order, a pair of auxiliary relays, means whereby both of said auxiliary relays are energized when one of said plurality of relays is energized, and means depending upon said order of energization and deenergization for deenergizing one of said auxiliary relays and maintaining the other energized for a predetermined time.

10. In combination, a pair of independent a-c. sources, a plurality of relays, means for energizing and deenergizing said relays in a predetermined order depending upon the relative frequency of said sources, a pair of auxiliary relays, means whereby both of said auxiliary relays are energized when one of said plurality of relays is energized, and means depending upon said order of energization and deenergization for deenergizing one of said auxiliary relays and maintaining the other energized for a predetermined time.

11. In combination, a pair of relays, means for energizing and deenergizing said relays in a predetermined order, a second pair of relays, means whereby both of the relays of said second pair are energized when one of the relays of said first pair is energized, and means depending upon said order of energization and deenergization for deenergizing one of the relays of the second pair and maintaining the other energized for a predetermined time.

12. In combination, a pair of polyphase a-c. sources, a pair of relays, means for energizing and deenergizing said relays in a predetermined order depending upon the relative frequency of said sources, a pair of auxiliary relays, means whereby both of said auxiliary relays are energized when one of said first pair of relays is energized, and means depending upon said order of energization and deenergization for deenergizing one of said auxiliary relays and maintaining the other energized for a predetermined time.

13. In combination, a pair of independent a-c. sources, a plurality of relays, and means for so connecting said relays to said sources that from a predetermined phase relation of said sources said relays are energized in a predetermined order when one of said sources has a higher frequency than the other and are energized in a different predetermined order when said one of said sources has a lower frequency than the other.

14. In combination, a pair of independent a-c. sources, a plurality of relays, means for so connecting said relays to said sources that from a predetermined phase relation of said sources said relays are energized in a predetermined order when one of said sources has a higher frequency than the other and are energized in a different predetermined order when said one of said sources has a lower frequency than the other, and means depending upon the order of energization of said relays for lowering or raising the frequency of one of said sources.

15. In combination, a pair of polyphase a-c. sources, a pair of relays, means for so connecting said relays to said sources that from a predetermined phase relation of said sources said relays are energized in a predetermined order depending upon the relative frequencies of said sources, and means whereby deenergization of one of said relays at a time while the other is energized causes a change in frequency of one of said sources in one direction and deenergization of said one of said relays at a time while the other is deenergized causes a change in frequency of said one of said sources in the other direction.

16. In combination, a pair of polyphase a-c. sources, a transformer connected across two of the phase conductors of one of said sources, a pair of transformers connected in open delta across the conductors of said other source, a relay having one terminal connected to the apex of the open delta of the secondaries of said pair of transformers and the other terminal to one of the terminals of the secondary of said first named transformer, a connection between the other terminal of the secondary of said first named transformer and a terminal of the open side of said delta, another relay having one terminal connected to said one of the terminals of the secondary of the first named transformer and the other terminal connected to the other open side of the secondary of said open delta transformers, and means controlled jointly by said relays for producing a predetermined effect.

17. In combination, a polyphase a-c. line, a polyphase a-c. generator, a prime mover for driving said generator, a pair of relays, means for so connecting said relays to said line and generator that from a predetermined phase relation thereof said relays are energized in a predetermined order, means including a motor for controlling the speed of said generator, a second pair of relays having front contacts controlling the directions of rotation of said motor respectively, one of said first pair of relays having front contacts for closing the circuits of said second pair of relays respectively and a back contact for controlling the circuit of said motor through the said direction controlling contacts of said second pair of relays, the other of said first pair of relays having front and back contacts for controlling said second pair of relays respectively, and means whereby deenergization of one of said first pair of relays causes one of said second pair of relays to remain energized and the other of said second pair to be deenergized respectively depending upon whether at that time the other of said first pair of relays is energized or deenergized.

18. In combination, a polyphase a-c. line, a polyphase a-c. generator, a prime mover for driving said generator, a pair of relays, means for so connecting said relays to said line and generator that from a predetermined phase relation thereof said relays are energized in a predetermined order, means including a motor for controlling the speed of said generator, a second pair of relays having front contacts controlling the directions of rotation of said motor respectively, one of said first pair of relays having front contacts for closing the circuits of said second pair of relays respectively and a back contact for controlling the circuit of said motor through the said direction controlling contacts of said second pair of relays, the other of said first pair of relays having front and back contacts for controlling said second pair of relays respectively, means whereby deenergization of one of said first pair of relays causes one of said second pair of relays to remain energized and the other of said second pair to be deenergized respectively depending upon whether at that time the other of said first pair of relays is energized or deenergized, means whereby said deenergization of said one of said first pair of relays locks said relay out, means whereby said deenergization of one of said second pair of relays locks the other in, and means for opening said locking means a predetermined time after energization of said motor.

In testimony whereof, the signature of the inventor is affixed hereto.

PAUL M. STIVENDER.